United States Patent
Sugiyama

(10) Patent No.: US 12,472,844 B2
(45) Date of Patent: Nov. 18, 2025

(54) VEHICLE CONTROL SYSTEM

(71) Applicant: Hitachi Astemo, Ltd., Hitachinaka (JP)

(72) Inventor: Yasushi Sugiyama, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/038,377

(22) PCT Filed: Sep. 27, 2021

(86) PCT No.: PCT/JP2021/035462
§ 371 (c)(1),
(2) Date: May 23, 2023

(87) PCT Pub. No.: WO2022/180908
PCT Pub. Date: Sep. 1, 2022

(65) Prior Publication Data
US 2023/0415608 A1 Dec. 28, 2023

(30) Foreign Application Priority Data
Feb. 26, 2021 (JP) ................................ 2021-030596

(51) Int. Cl.
*B60L 58/18* (2019.01)
*B60W 20/50* (2016.01)

(52) U.S. Cl.
CPC ............ *B60L 58/18* (2019.02); *B60W 20/50* (2013.01); *B60L 2210/10* (2013.01); *B60W 2510/242* (2013.01)

(58) Field of Classification Search
CPC ..... B60L 58/18; B60L 2210/10; B60W 20/50; B60W 2510/242
See application file for complete search history.

(56) References Cited

U.S. PATENT DOCUMENTS 9,037,334 B1 * 5/2015 Cole .................... B60W 10/06
701/22
9,475,482 B2 * 10/2016 Niste .................... B60W 20/00
(Continued)

FOREIGN PATENT DOCUMENTS

CN 102991331 A 3/2013
CN 112203891 B * 12/2023 .............. B60L 58/10
(Continued)

OTHER PUBLICATIONS

International Search Report, PCT/JP2021/035462, Dec. 14, 2021 (3 pgs.).
(Continued)

*Primary Examiner* — Peter D Nolan
*Assistant Examiner* — Matthew Cobb
(74) *Attorney, Agent, or Firm* — Volpe Koenig

(57) ABSTRACT

A vehicle control system is capable of implementing a fail operation while ensuring safety of traveling of a vehicle even when a power source function failure of a battery occurs. The vehicle control system includes an HV battery, first, second, third and fourth high-voltage relays that are redundantly arranged on an upstream side and a downstream side of the HV battery, a first and second DC-DC converters that are connected to the relays, a first and second high-voltage SW control units that are disposed on a downstream side of the converters and control the relays, and an in-vehicle battery disposed on a downstream side of the second DC-DC converter. The first high-voltage SW control unit and the second high-voltage SW control unit interrupt the relays and control a vehicle based on electric power of the in-vehicle battery on condition that an abnormality of the HV battery is detected.

10 Claims, 4 Drawing Sheets

(56) References Cited

U.S. PATENT DOCUMENTS

| | | |
|---|---|---|
| 2010/0006360 A1 | 1/2010 | Kishimoto |
| 2013/0066499 A1 | 3/2013 | Niste et al. |
| 2020/0017115 A1 | 1/2020 | Higashitani et al. |
| 2022/0048495 A1* | 2/2022 | Cho .................. B60W 10/08 |

FOREIGN PATENT DOCUMENTS

| | | | |
|---|---|---|---|
| JP | 2007-28803 A | | 2/2007 |
| JP | 2010-018183 A | | 1/2010 |
| JP | 2011010508 A | * | 1/2011 |
| JP | 6652103 B2 | | 2/2020 |
| JP | 2022117722 A | * | 8/2022 |

OTHER PUBLICATIONS

Chinese Office Action issued on Aug. 26, 2025 for Chinese Patent Application No. 202180081812.1.

* cited by examiner

VEHICLE CONTROL SYSTEM

TECHNICAL FIELD

The present invention relates to a vehicle control system for a hybrid vehicle having different drive systems.

BACKGROUND ART

Conventionally, when a power source function failure occurs due to an abnormality of an in-vehicle battery during traveling of a vehicle not equipped with an automatic driving function, vehicle driving torque is lost and the traveling is switched to coasting. However, a driver of the vehicle safely stops the vehicle by operating a steering wheel. However, in a vehicle equipped with an advanced automatic driving function that does not require a steering wheel operation, when a power source function failure occurs during traveling of the vehicle, advanced automatic driving cannot be continued. Therefore, a so-called fail operation of continuing automatic driving to a road shoulder or a parking lot without causing the vehicle to become uncontrollable and of safely stopping the vehicle is required. On the other hand, electrification of vehicles is progressing against the background of exhaust gas regulations and environmental regulations for protecting the environment, and vehicles equipped with HV batteries that supply high-voltage power to drive motors of vehicles are increasing in number. Even when a power source function failure occurs due to an abnormality of an HV battery occurs, a vehicle control system that performs a fail operation is required.

As this type of vehicle control system, there is disclosed a vehicle control system including a power source circuit including a relay device capable of changing a connection state of a plurality of power sources and power source wirings, a failure detection device that detects a failure state of the relay device, a power source control device, and an automatic driving control unit, in which when the failure detection device detects that a failure corresponding to a specific failure pattern has occurred in the relay device, the automatic driving control unit performs a fail operation by limiting some control functions of the automatic driving (PTL 1).

However, the one described in PTL 1 has a problem that when a power source function failure occurs due to an abnormality of an HV battery or an in-vehicle battery, the relay device may be turned off, and the fail operation may not be performed.

CITATION LIST

Patent Literature

PTL 1: Japanese Patent No. 6652103

SUMMARY OF INVENTION

Technical Problem

An object is to provide a vehicle control system capable of implementing a fail operation while ensuring safety of traveling of a vehicle even when a power source function failure of a battery occurs.

Solution to Problem

A vehicle control system according to the present invention that solves the above problem is a vehicle control system for a hybrid vehicle having two different drive systems, the vehicle control system including: a first battery; a second battery; a relay circuit disposed on an upstream side and a downstream side of the first battery; a first DC-DC converter connected to the relay circuit; a second DC-DC converter connected to the relay circuit and connected in parallel to the first DC-DC converter; a first relay control unit that controls the relay circuit; a second relay control unit that controls the relay circuit; a first drive control unit that controls a first drive system; and a second drive control unit that controls a second drive system, wherein the first relay control unit and the first drive control unit are connected to a downstream side of the first DC-DC converter, the second relay control unit, the second battery, and the second drive control unit are connected to a downstream side of the second DC-DC converter, the first relay control unit and the second relay control unit interrupt the relay circuit on condition that an abnormality of the first battery is detected, and the second drive control unit performs control to drive the second drive system using electric power of the second battery as a power source in response to the interruption of the relay circuit.

According to the vehicle control system according to the present invention, when an abnormality is detected in the first battery, the vehicle is controlled by the second battery.

Advantageous Effects of Invention

According to the present invention, it is possible to provide a vehicle control system capable of implementing a fail operation while ensuring safety of traveling of a vehicle even when a power source function failure of a battery occurs.

Further features related to the present invention will become apparent from the description of the present specification and the accompanying drawings. Problems, configurations, and effects other than those described above will be clarified by the following description of embodiments.

DESCRIPTION OF EMBODIMENTS

Hereinafter, vehicle control systems 30 and 30A according to a first embodiment and a second embodiment to which a vehicle control system according to the present invention is applied, and vehicle control systems 30B and 30C according to Modification 1 and Modification 2 of the second embodiment will be described with reference to the drawings. Note that a relay circuit according to the present invention will be described by being included in the description of the vehicle control systems 30 and 30A.

First Embodiment

Figure 1:
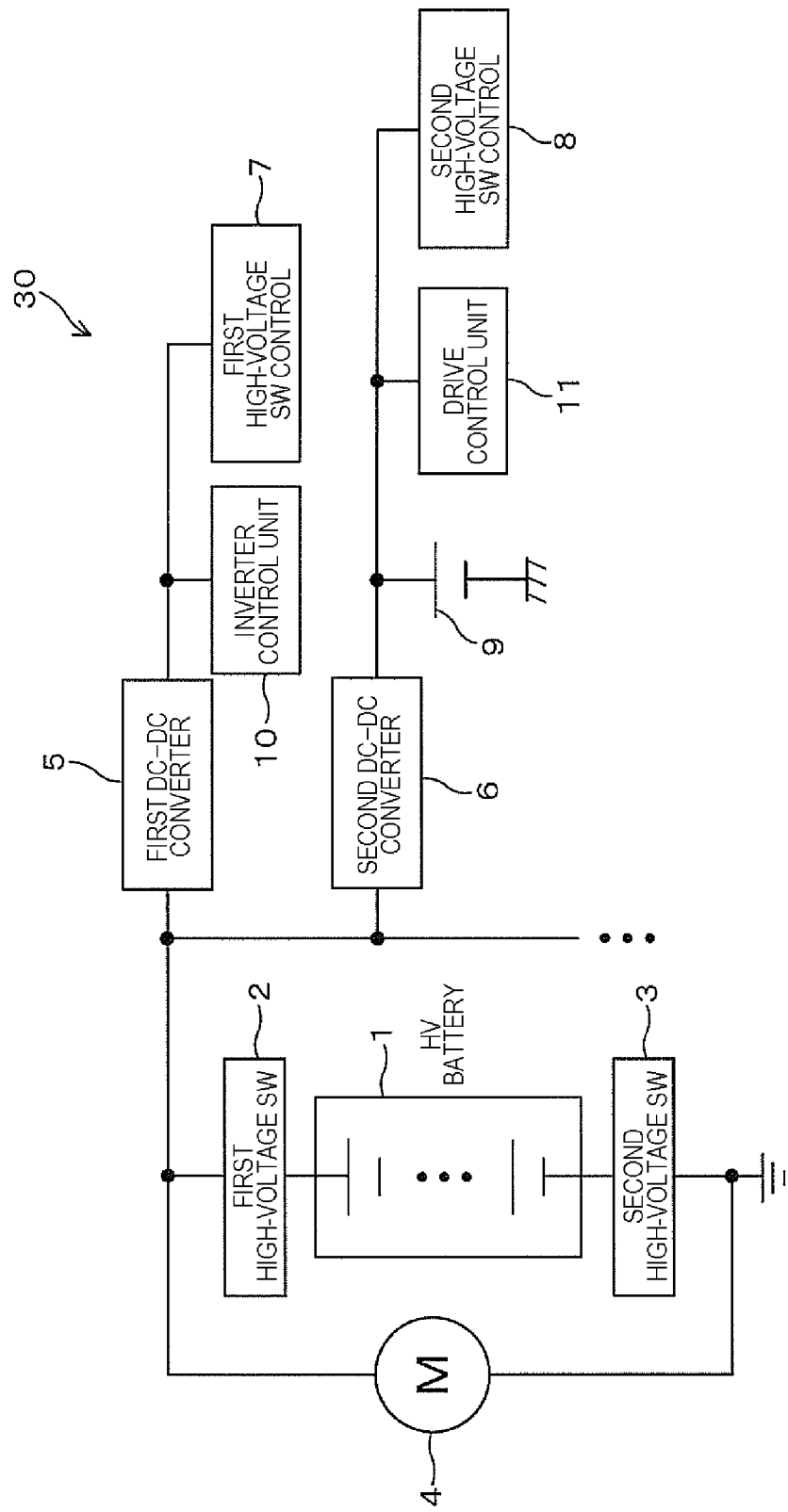
FIG. 1 is a schematic configuration diagram of a vehicle control system according to a first embodiment.

The vehicle control system 30 is mounted on a vehicle that performs automatic driving. As illustrated in FIG. 1, the vehicle control system 30 includes an HV battery 1, a first high-voltage SW 2, a second high-voltage SW 3, a motor 4, a first DC-DC converter 5, a second DC-DC converter 6, a first high-voltage SW control unit 7, a second high-voltage SW control unit 8, an in-vehicle battery 9, an inverter control unit 10, and a drive control unit 11, and controls traveling of the vehicle by an in-vehicle ECU (not illustrated). The vehicle is a hybrid vehicle (hybrid electric vehicle (HEV)) having two different drive systems. In the present embodiment, the hybrid vehicle including, as the two drive systems, a drive device such as an engine (internal combustion engine) (not illustrated) and the motor 4 for traveling as power sources is described as an example.

The vehicle control system 30 performs a fail operation in the traveling control of the vehicle when a power source function failure such as blown fuse, overcharge abnormality, or short circuit failure occurs in any of the HV battery 1 and the in-vehicle battery 9. The HV battery 1 of the first embodiment corresponds to a first battery of the vehicle control system according to the present invention, the first high-voltage SW 2 and the second high-voltage SW 3 correspond to a relay circuit, the first high-voltage SW control unit 7 corresponds to a second relay control unit, the second high-voltage SW control unit 8 corresponds to a first relay control unit, the in-vehicle battery 9 corresponds to a second battery, the inverter control unit 10 corresponds to a first drive control unit, and the drive control unit 11 corresponds to a second drive control unit.

The HV battery 1 includes a power source that outputs high-voltage power capable of driving the motor 4 of the hybrid vehicle. The first high-voltage SW 2 that turns on or off a power source line is disposed on the upstream side, and the second high-voltage SW 3 that turns on or off a power source line is redundantly disposed on the downstream side. The operations of the first high-voltage SW 2 and the second high-voltage SW 3 are controlled by at least one of the first high-voltage SW control unit 7 and the second high-voltage SW control unit 8.

The first DC-DC converter 5 is configured to step down a high voltage output from the HV battery 1, and is connected to the first high-voltage SW 2 that is a relay circuit. The inverter control unit 10 that controls the operation of the motor 4 is connected to the downstream side of the first DC-DC converter 5, and the first high-voltage SW control unit 7 is connected to the downstream side of the inverter control unit 10.

The second DC-DC converter 6 is connected in parallel to the first DC-DC converter 5. The in-vehicle battery 9, the drive control unit 11, and the second high-voltage SW control unit 8 are connected to the downstream side of the second DC-DC converter 6. The in-vehicle battery 9 is configured similarly to a power source such as an auxiliary battery mounted on a conventional vehicle and connected to a 12 V control unit, and is configured to supply, to the drive control unit 11, electric power having a relatively low voltage, for example, 12 V, as compared with the HV battery 1. The drive control unit 11 is configured to control a drive device different from the motor 4, for example, the drive device such as the engine.

In the vehicle control system 30, for example, when an abnormality of the HV battery 1, such as blown fuse or overcharge of the HV battery 1, is detected by a control unit (abnormality detection unit) (not illustrated) that monitors the voltage of the HV battery 1, and the first high-voltage SW control unit 7 and the second high-voltage SW control unit 8 receive a control signal indicating the abnormality, the first high-voltage SW control unit 7 and the second high-voltage SW control unit 8 turn off the first high-voltage SW 2 and the second high-voltage SW 3.

As a result, electric power from the HV battery 1 is not supplied to the first DC-DC converter 5 and the second DC-DC converter 6, and the operations of the inverter control unit 10 and the first high-voltage SW control unit 7 connected to the downstream side of the first DC-DC converter 5 are not continued.

However, the in-vehicle battery 9 is disposed downstream of the second DC-DC converter 6, and the drive control unit 11 and the second high-voltage SW control unit 8 can receive power supply from the in-vehicle battery 9. Therefore, the drive device such as the engine can be operated by the control of the drive control unit 11, and the fail operation can be performed.

In addition, in the vehicle control system 30, for example, when an abnormality occurs in the in-vehicle battery 9, such as occurrence of a short failure of the in-vehicle battery 9, electric power is not supplied from the in-vehicle battery 9 to the drive control unit 11, and the drive device such as the engine cannot be driven. In addition, electric power is also not supplied to the second high-voltage SW control unit 8, and the relay circuit cannot be controlled by the second high-voltage SW control unit 8.

However, even when an abnormality occurs in the in-vehicle battery 9, the power source lines connected from the HV battery 1 to the first DC-DC converter 5 and the second DC-DC converter 6 are conductive. Therefore, the control of the relay circuit by the first high-voltage SW control unit 7 is performed without any trouble, and the first high-voltage SW 2 and the second high-voltage SW 3 are maintained in the ON state.

Therefore, the inverter control unit 10 controls the driving of the motor 4 with electric power supplied from the HV battery 1, and performs a fallback of maintaining the operation in a state where the function and performance of the system are partially stopped, whereby the fail operation can be performed. Note that the specific content of operation control in the fallback is not particularly limited as long as the fail operation can be performed.

Although the case where the abnormality occurs in the in-vehicle battery 9 has been described, the fail operation by the fallback can be performed similarly to the case where the abnormality occurs in the in-vehicle battery 9 even when an abnormality, such as a short-circuit failure of the output of the second DC-DC converter 6 or disconnection of the power source line of the in-vehicle battery 9, occurs in the power source line including the second DC-DC converter 6 and the in-vehicle battery 9.

The vehicle control system 30 can also perform control to stop the interruption of the first high-voltage SW 2 and the second high-voltage SW 3 by the second relay control unit and connect the first high-voltage SW 2 and the second high-voltage SW 3 again on condition that a start signal to start the hybrid vehicle is received.

An effect of the vehicle control system 30 of the first embodiment will be described.

As illustrated in FIG. 1, the vehicle control system 30 of the first embodiment includes the HV battery 1, the first high-voltage SW 2, the second high-voltage SW 3, the motor 4, the first DC-DC converter 5, the second DC-DC converter 6, the first high-voltage SW control unit 7, the second high-voltage SW control unit 8, the in-vehicle battery 9, the inverter control unit 10, and the drive control unit 11.

That is, in the vehicle control system 30, the first high-voltage SW control unit 7 and the second high-voltage SW control unit 8 that respectively control the first high-voltage SW 2 on the upstream side of the HV battery 1 and the second high-voltage SW 3 on the downstream side of the HV battery 1 are redundantly arranged downstream of the first DC-DC converter 5 and the second DC-DC converter 6, respectively. The vehicle control system 30 includes the two power source lines. Further, the in-vehicle battery 9 and the drive control unit 11 are disposed on the same power source line.

With this configuration, when an abnormality occurs in the HV battery 1, the drive control unit 11 and the second high-voltage SW control unit 8 can receive power supply from the in-vehicle battery 9. As a result, the drive device such as the engine can be operated by the control of the drive control unit 11, and the effect that the fail operation can be performed while the safety of traveling is secured can be obtained.

In addition, even in a case where an abnormality occurs in the in-vehicle battery 9, since the power source line connected from the HV battery 1 to the first DC-DC converter 5 is conductive, it is possible to obtain the effect that the inverter control unit 10 can control the driving of the motor 4 with electric power supplied from the HV battery 1, and that it is possible to perform the fail operation while ensuring the safety of traveling.

As described above, the vehicle control system 30 according to the first embodiment includes the respective components illustrated in FIG. 1. However, the vehicle control system according to the present invention may include components other than the components illustrated in FIG. 1. The vehicle control system 30A according to the second embodiment including other components will be described below with reference to the drawings. Note that the same reference numerals are used for the same configurations as those of the vehicle control system 30 according to the first embodiment, and a detailed description thereof will be omitted.

Second Embodiment

Figure 2:
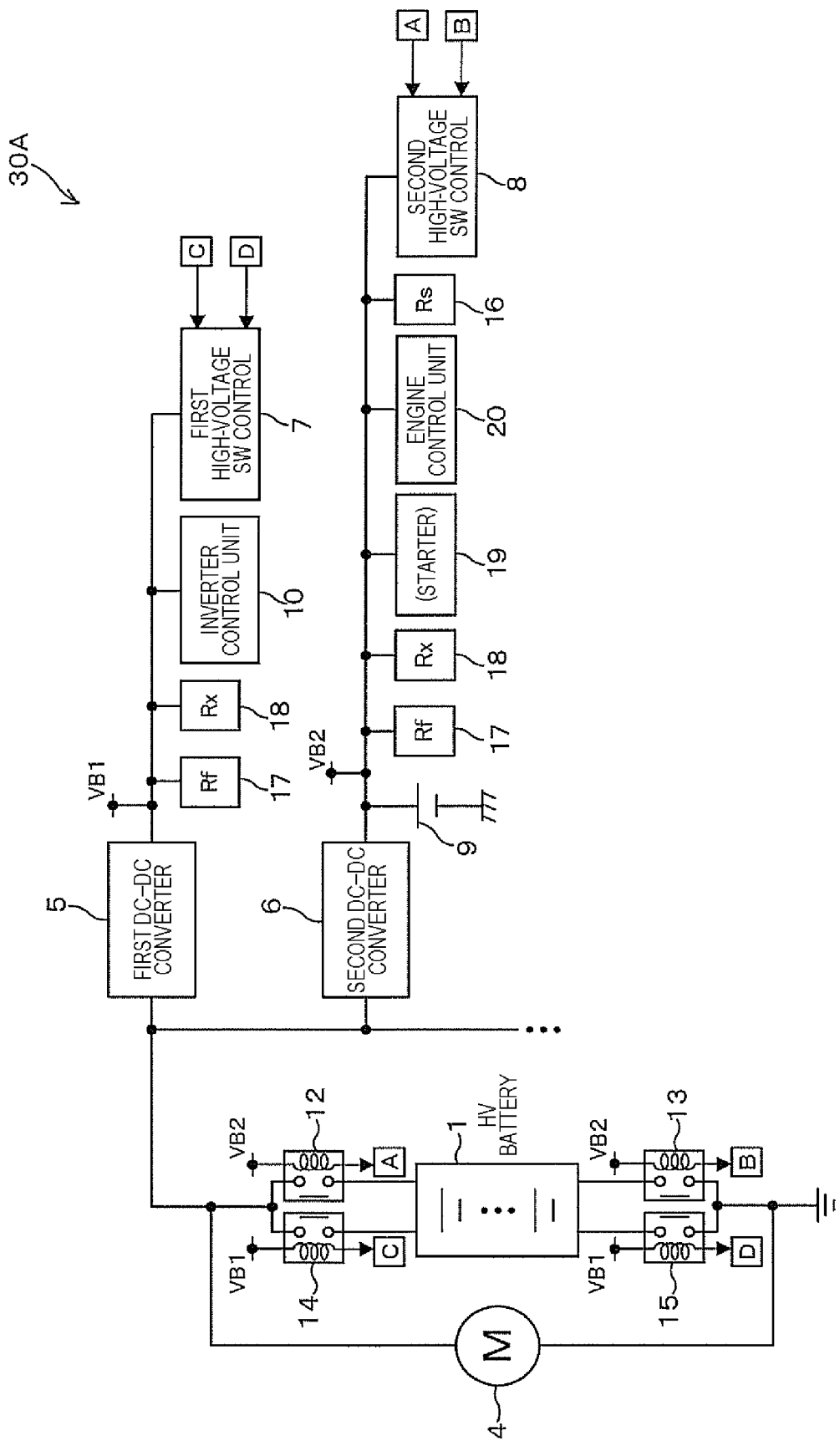
FIG. 2 is a schematic configuration diagram of a vehicle control system according to a second embodiment.

FIG. 2 is a schematic configuration diagram of the vehicle control system according to the second embodiment.

The vehicle control system 30A according to the second embodiment is mounted on a vehicle that performs automatic driving. As illustrated in FIG. 2, a first high-voltage relay 12 and a third high-voltage relay 14 connected in parallel to each other are connected to the upstream side of an HV battery 1, and a second high-voltage relay 13 and a fourth high-voltage relay 15 connected in parallel to each other are connected to the downstream side of the HV battery 1.

A load Rf 17 for a fail operation, another load Rx 18, an inverter control unit 10, and a first high-voltage SW control unit 7 are connected downstream of a first DC-DC converter 5. A load Rf 17 for the fail operation, another load Rx 18, a starter 19, an engine control unit 20, and a second high-voltage SW control unit 8 are connected downstream of a second DC-DC converter 6.

Similarly to the vehicle control system 30 according to the first embodiment, the vehicle is a hybrid vehicle including a drive device such as an engine (not illustrated) and a motor 4 as power sources. The first high-voltage relay 12 of the second embodiment corresponds to a first relay of the vehicle control system according to the present invention, the second high-voltage relay 13 corresponds to a third relay, the third high-voltage relay 14 corresponds to a second relay, and the fourth high-voltage relay 15 corresponds to a fourth relay.

The first high-voltage relay 12 and the third high-voltage relay 14 that turn on or off a power source line are disposed on the upstream side of the HV battery 1, and the second high-voltage relay 13 and the fourth high-voltage relay 15 that turn on or off a power source line are disposed on the downstream side of the HV battery 1.

The operations of the first high-voltage relay 12 and the second high-voltage relay 13 (A and B illustrated in FIG. 2) are controlled by the second high-voltage SW control unit 8, and the operations of the third high-voltage relay 14 and the fourth high-voltage relay 15 (C and D illustrated in FIG. 2) are controlled by the first high-voltage SW control unit 7.

The first DC-DC converter 5 is configured to step down a high voltage output from the HV battery 1, and is connected to the first high-voltage relay 12 and the third high-voltage relay 14. The load Rf 17 for the fail operation, the other load Rx 18 arbitrarily arranged, and the inverter control unit 10 are connected to the downstream side of the first DC-DC converter 5, and the first high-voltage SW control unit 7 is connected to the downstream side of the inverter control unit 10.

An in-vehicle battery 9 is not disposed on the downstream side of the first DC-DC converter 5, and there is a concern such as a voltage drop with respect to a transient load increase in the load Rf 17 for the fail operation. Therefore, it is preferable to perform a fallback at the time of the fail operation with respect to the load on the downstream side of the first DC-DC converter 5. Examples of the fallback at the time of the fail operation include suppressing motor torque (N·m) at the time of power steering control.

The second DC-DC converter 6 is connected in parallel to the first DC-DC converter 5. The in-vehicle battery 9, the load Rf 17 for the fail operation, the load Rx 18 arbitrarily arranged, the starter 19, the engine control unit 20, a load Rs 16 requiring standby, and the second high-voltage SW control unit 8 are connected to the downstream side of the second DC-DC converter 6.

The load Rs 16 requiring standby is a load that receives an ignition key signal and permits electric power to be supplied from the in-vehicle battery 9 and the second DC-DC converter 6 to the in-vehicle devices, and specific examples thereof include loads such as a smart key control Assy and a body control unit (body control modules (BCMs)) that monitor a body of the vehicle and functions such as security. Specific examples of the load Rf 17 for the fail operation include power steering control and automatic driving control.

The starter 19 is a motor for starting the vehicle. In the hybrid vehicle, the starter 19 may be used when the HV battery 1 fails. For example, it is used to drive a drive system of the vehicle by the starter 19 to move the vehicle from a traveling lane to a road shoulder. The engine control unit 20 is configured to control the operation of the engine (not illustrated).

Each of the first high-voltage SW control unit 7 and the second high-voltage SW control unit 8 includes a microcomputer, and has a function of detecting a failure such as sticking or disconnection of the first high-voltage relay 12, the second high-voltage relay 13, the third high-voltage relay 14, and the fourth high-voltage relay 15. When the contact of each relay is changed from the interruption state to the conduction state, large inrush current to a capacitor may cause welding or sticking to the contact of each relay or disconnection of each relay. The first high-voltage SW control unit 7 and the second high-voltage SW control unit 8 can detect these failures.

The first high-voltage SW control unit 7 and the second high-voltage SW control unit 8 diagnose these failures before the start of the vehicle, and take appropriate measures at the time of abnormality. The first high-voltage relay 12 and the third high-voltage relay 14 are redundantly disposed on the upstream side of the HV battery 1, the second high-voltage relay 13 and the fourth high-voltage relay 15 are redundantly disposed on the downstream side of the HV battery 1. The first high-voltage relay 12 and the third high-voltage relay 14, and the second high-voltage relay 13 and the fourth high-voltage relay 15 are configured to reliably disconnect the HV battery 1 from the power source lines even when any one of the high-voltage relays has a sticking failure.

Further, a monitoring function is implemented in the microcomputers mounted in the first high-voltage SW control unit 7 and the second high-voltage SW control unit 8. When an abnormality such as program runaway of the microcomputers occurs, the first high-voltage SW control unit 7 and the second high-voltage SW control unit 8 are configured to turn off each of the high-voltage relays by the monitoring functions.

Next, a procedure for starting the vehicle by the vehicle control system 30A according to the second embodiment will be briefly described.

First, when the load Rs 16 requiring standby such as a standby state of the vehicle receives a key-on signal, electric power is supplied from the in-vehicle battery 9 to the second high-voltage SW control unit 8. The first high-voltage relay 12 and the second high-voltage relay 13 are turned on by the second high-voltage SW control unit 8, and the first DC-DC converter 5 and the second DC-DC converter 6 can be activated. Then, electric power is supplied from the first DC-DC converter 5 to the first high-voltage SW control unit 7. The third high-voltage relay 14 and the fourth high-voltage relay 15 are turned on by the first high-voltage SW control unit 7, and the vehicle can start by the driving force of the motor 4.

Here, during normal operation, the first high-voltage SW control unit 7 does not necessarily turn on the third high-voltage relay 14 and the third high-voltage relay 15 (C and D illustrated in FIG. 2). During normal operation, the second high-voltage SW control unit 8 may turn on only the first high-voltage relay 12 and the second high-voltage relay 13 (A and B illustrated in FIG. 2). Only when an abnormality occurs and the first high-voltage relay 12 and the second high-voltage relay 13 (A and B illustrated in FIG. 2) are turned off, the first high-voltage SW control unit 7 may turn on the third high-voltage relay 14 and the fourth high-voltage relay 15 (C and D illustrated in FIG. 2) to perform the fallback. As long as electric power is supplied from the first DC-DC converter 5 to the first high-voltage SW control unit 7, even if the configurations are different, the fallback by the fail operation can be performed by another method.

A procedure when an abnormality occurs in the HV battery 1 according to the second embodiment will be described. For example, when an overcharge abnormality occurs in the HV battery 1, the first high-voltage SW control unit 7 and the second high-voltage SW control unit 8 receive an abnormality notification signal from a control unit that monitors the voltage of the HV battery 1. The first high-voltage SW control unit 7 and the second high-voltage SW control unit 8 turn off all of the first high-voltage relay 12 and the second high-voltage relay 13 (A and B illustrated in FIG. 2), and the third high-voltage relay 14 and the fourth high-voltage relay 15 (C and D illustrated in FIG. 2). That is, fail safe of the HV battery 1 is implemented.

When all of A, B, C, and D illustrated in FIG. 2 are turned off, electric power from the HV battery 1 is not supplied to the first DC-DC converter 5 and the second DC-DC converter 6, and the loads connected to the downstream side of the first DC-DC converter 5 cannot continue the operation. However, the loads connected to the second DC-DC converter 6 include the in-vehicle battery 9, and electric power can be supplied from the in-vehicle battery 9 to the engine control unit 20 and the load Rf 17 for the fail operation. As a result, the engine control unit 20 controls the engine by the power supply from the in-vehicle battery 9, and the fail operation is performed in the fallback.

Conventionally, when a voltage abnormality occurs in an HV battery 1, there is a risk that the HV battery 1 overheats. Therefore, there is a demand for immediately turning off each high-voltage relay to implement fail safe. In addition, when the HV battery 1 comes into contact with the body due to a vehicle accident or the like, there is a possibility that electricity flows to the body. Therefore, there is a demand for implementing fail safe by immediately turning off each high-voltage relay after receiving a failure notification signal from an airbag. In response to such a request, it is possible to satisfy a conventional request for fail safe by the vehicle control of the vehicle control system 30A according to the second embodiment.

A procedure when an abnormality occurs in the in-vehicle battery 9 according to the second embodiment will be described. For example, when a short-circuit failure occurs in the in-vehicle battery 9, electric power is not supplied to the engine control unit 20, and the engine cannot be driven by power supply from the in-vehicle battery 9.

Electric power is not supplied to the second high-voltage SW control unit 8 either, and the first high-voltage relay 12 and the second high-voltage relay 13 (A and B illustrated in FIG. 2) are turned off. However, the third high-voltage relay 14 and the fourth high-voltage relay 15 (C and D illustrated in FIG. 2) are controlled by the first high-voltage SW control unit 7, the third high-voltage relay 14 and the fourth high-voltage relay 15 (C and D illustrated in FIG. 2) are turned on, and the power source line connected from the HV battery 1 to the first DC-DC converter 5 becomes conductive. Therefore, the driving of the motor 4 is controlled by the inverter control unit 10, and the fallback is performed with the load Rf 17 for the fail operation.

Although the abnormality of the in-vehicle battery 9 has been described in the example described above, the fail operation according to the procedure when the abnormality occurs in the in-vehicle battery 9 is similarly performed for an abnormality of a power source network including the second DC-DC converter 6 and the in-vehicle battery 9, such as the short-circuit failure of the output of the second DC-DC converter 6 or the disconnection of the power source line of the in-vehicle battery 9.

When the in-vehicle battery 9 and the HV battery 1 are normal, the first high-voltage relay 12 and the second high-voltage relay 13 (A and B illustrated in FIG. 2), and the third high-voltage relay 14 and the fourth high-voltage relay 15 (C and D illustrated in FIG. 2) are all in an ON state. The first high-voltage relay 12, the second high-voltage relay 13, the third high-voltage relay 14, and the fourth high-voltage relay 15 are implemented by a low-side driver in the vehicle control system 30A according to the second embodiment, but may be implemented by a high-side driver.

An effect of the vehicle control system 30A according to the second embodiment will be described.

As illustrated in FIG. 2, the vehicle control system 30A includes the HV battery 1, the motor 4, the first DC-DC converter 5, the second DC-DC converter 6, the first high-voltage SW control unit 7, the second high-voltage SW control unit 8, the in-vehicle battery 9, and the inverter control unit 10. The vehicle control system 30A includes the first high-voltage relay 12, the second high-voltage relay 13, the third high-voltage relay 14, the fourth high-voltage relay 15, the load Rs 16, the load Rf 17, the load Rx 18, the starter 19, and the engine control unit 20.

That is, in the vehicle control system 30A, the first high-voltage SW control unit 7 and the second high-voltage SW control unit 8 that respectively control the first high-voltage relay 12 and the third high-voltage relay 14 on the upstream side of the HV battery 1 and the second high-voltage relay 13 and the fourth high-voltage relay 15 on the downstream side of the HV battery 1 are redundantly arranged downstream of the first DC-DC converter 5 and the second DC-DC converter 6, and the vehicle control system includes the two power source lines. Further, the in-vehicle battery 9, the starter 19, and the engine control unit 20 are disposed on the same power source line. With this configuration, even when an abnormality occurs in the in-vehicle battery 9, since the power source line connected from the HV battery 1 to the first DC-DC converter 5 is conductive, it is possible to obtain the effect that the inverter control unit 10 can perform the drive control of the motor 4 by using electric power supplied from the HV battery 1, and that it is possible to perform the fail operation while ensuring the safety of traveling.

When an abnormality occurs in the HV battery 1, the in-vehicle battery 9 is disposed downstream of the second DC-DC converter 6, and the starter 19, the engine control unit 20, and the second high-voltage SW control unit 8 can receive power supply from the in-vehicle battery 9. As a result, it is possible to operate the engine by the control of the engine control unit 20, and it is possible to obtain the effect of performing the fail operation while ensuring the safety of traveling.

As described above, the vehicle control system 30A according to the second embodiment includes the respective components illustrated in FIG. 2. However, the vehicle control system according to the present invention may include components other than the components illustrated in FIG. 2. Hereinafter, Modification 1 and Modification 2 of the vehicle control system 30A according to the second embodiment including other components will be described with reference to the drawings. Note that the same reference numerals are used for the same configurations as those of the vehicle control system 30A according to the second embodiment, and a detailed description thereof will be omitted.

Modification 1

Figure 3:
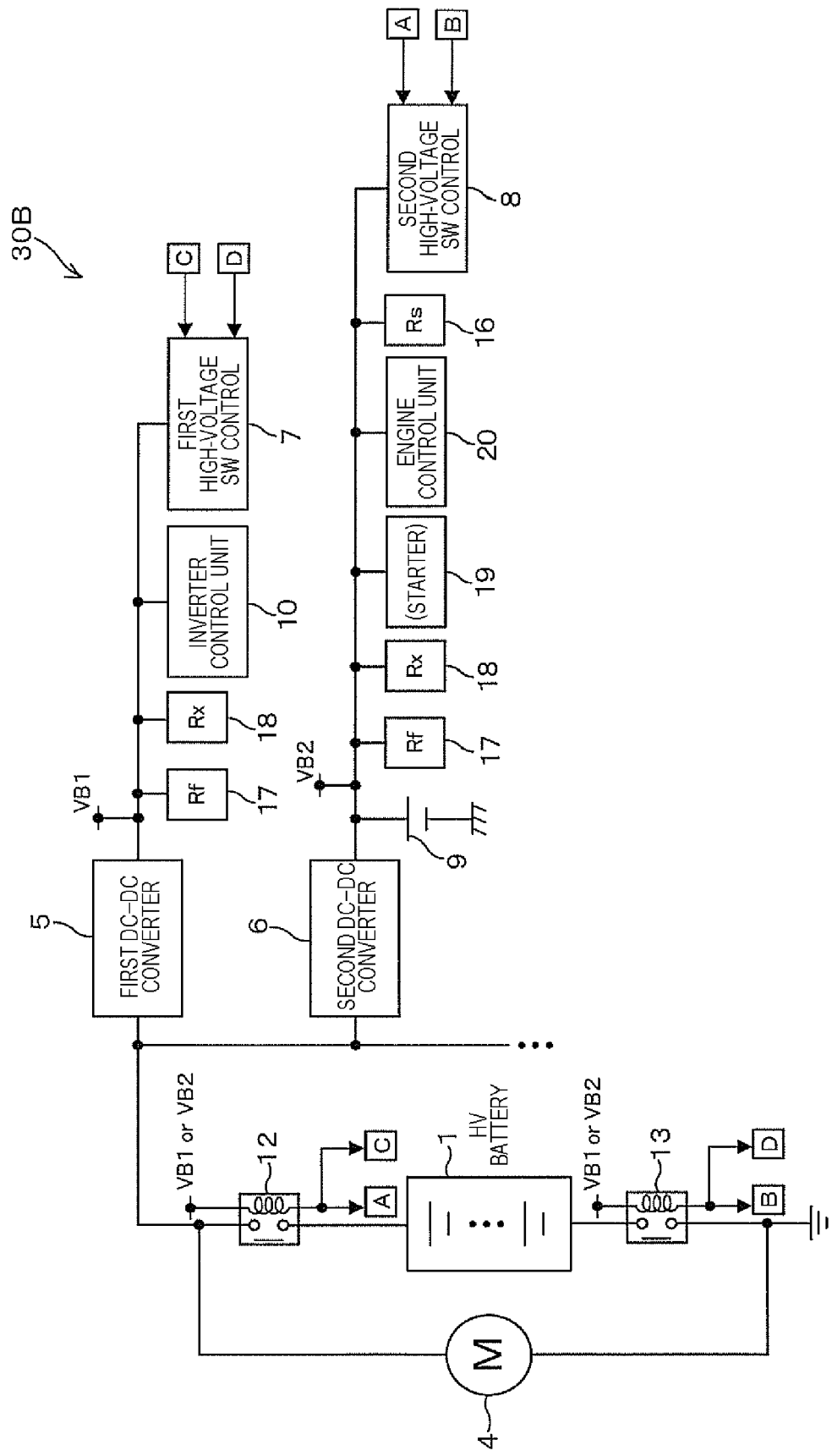
FIG. 3 is a schematic configuration diagram of a vehicle control system according to Modification 1 of the second embodiment.

FIG. 3 is a schematic configuration diagram of a vehicle control system according to Modification 1 of the second embodiment.

As illustrated in FIG. 3, unlike the vehicle control system 30A according to the second embodiment, in the vehicle control system 30B according to Modification 1, only a first high-voltage relay 12 is disposed on the upstream side of the HV battery 1, and only a second high-voltage relay 13 is disposed on the downstream side of the HV battery 1. The other components are the same components as those of the vehicle control system 30A according to the second embodiment.

The first high-voltage relay 12 is branched into A and C illustrated in FIG. 3, and the second high-voltage relay 13 is branched into B and D illustrated in FIG. 3. C and D are controlled by the first high-voltage SW control unit 7, and A and B are controlled by the second high-voltage SW control unit 8. The first high-voltage relay 12 is turned on or off by the first high-voltage SW control unit 7 and the second high-voltage SW control unit 8, and the second high-voltage relay 13 is turned on or off by the first high-voltage SW control unit 7 and the second high-voltage SW control unit 8.

Also with this configuration, effects similar to those of the vehicle control system 30A according to the second embodiment can be obtained. That is, even when a power source function failure of the HV battery 1 or the in-vehicle battery 9 occurs, it is possible to obtain the effect that the fail operation can be implemented while ensuring the safety of the traveling of the vehicle. In this configuration, for example, when a short-circuit failure occurs in the in-vehicle battery 9, a SW for disconnection is required so that the power source of the first high-voltage relay 12 and the second high-voltage relay 13 does not decrease.

Modification 2

Figure 4:
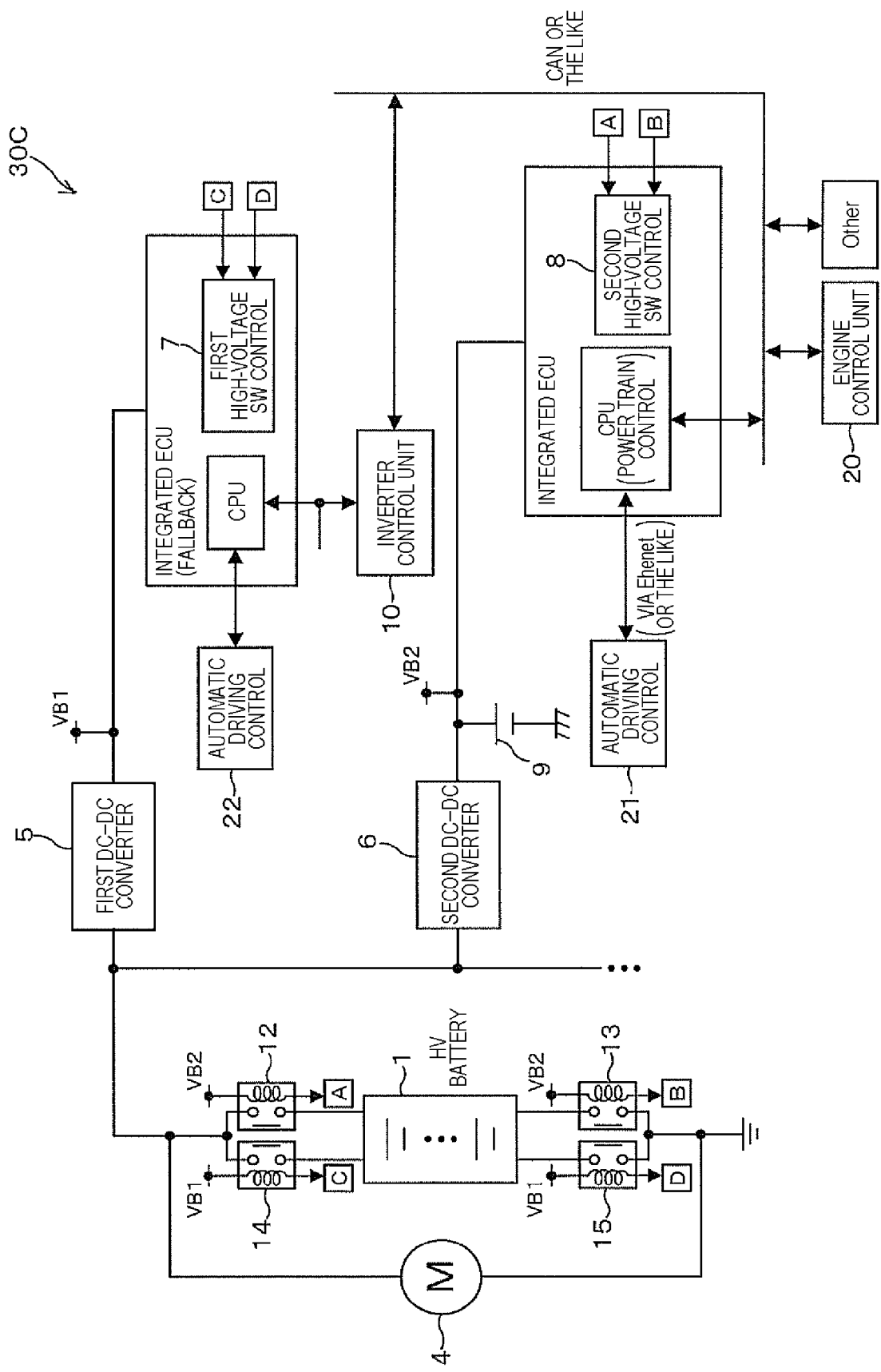
FIG. 4 is a schematic configuration diagram of a vehicle control system according to Modification 2 of the second embodiment.

FIG. 4 is a schematic configuration diagram of a vehicle control system according to Modification 2 of the second embodiment.

As illustrated in FIG. 4, the vehicle control system 30C according to Modification 2 is configured by power train control in which power train control is integrated, unlike the vehicle control system 30A according to the second embodiment. As an E/E architecture which is a wired network suitable for advanced automatic driving, the vehicle control system 30C connects a centralized control ECU in which calculation necessary for driving the vehicle is centralized and a plurality of integrated control ECUs arranged for each domain or zone by high-speed communication such as Ethernet.

Specifically, as illustrated in FIG. 4, in the vehicle control system 30C, a first integrated ECU including the engine control unit 20, the second high-voltage SW control unit 8, and the like is disposed downstream of the second DC-DC converter 6, and a first automatic driving control unit 21 is disposed downstream of the second DC-DC converter 6. On the other hand, a second integrated ECU including the inverter control unit 10, the first high-voltage SW control unit 7, and the like is disposed downstream of the first DC-DC converter 5, and a second automatic driving control unit 22 by fallback control for the purpose of the fail operation is disposed downstream of the first DC-DC converter 5. When a power source function failure occurs in the in-vehicle battery 9, electric power can be supplied from the first DC-DC converter 5 to the integrated ECU for fallback control and the like, so that the fail operation can be performed. For example, the second high-voltage SW control unit 8 may be integrated with the first automatic driving control unit 21, or may be disposed in an independent ECU.

The vehicle control system 30C according to Modification 2 can obtain the same effects as those of the vehicle control system 30A according to the second embodiment. That is, even when a power source function failure of the HV battery 1 or the in-vehicle battery 9 occurs, it is possible to obtain the effect that the fail operation can be implemented while ensuring the safety of the traveling of the vehicle.

Although the first embodiment and the second embodiment of the present invention have been described in detail above, the present invention is not limited to the above embodiments, and various design changes can be made without departing from the gist of the present invention described in the claims. For example, the above-described embodiments have been described in detail for easy understanding of the present invention, and are not necessarily limited to those having all the described configurations. In addition, a part of the configuration of a certain embodiment can be replaced with the configuration of another embodiment, and the configuration of a certain embodiment can be added to the configuration of another embodiment. In addition, for a part of the configuration of each embodiment, it is possible to add, delete, and replace another configuration.

REFERENCE SIGNS LIST

1 HV battery (first battery)
2 first high-voltage SW (relay circuit)
3 second high-voltage SW (relay circuit)
4 motor
5 first DC-DC converter
6 second DC-DC converter
7 first high-voltage SW control unit (second relay control unit)
8 second high-voltage SW control unit (first relay control unit)
9 in-vehicle battery (second battery)
10 inverter control unit (first drive control unit)
11 drive control unit (second drive control unit)
12 first high-voltage relay (first relay)
13 second high-voltage relay (third relay)
14 third high-voltage relay (second relay)
15 fourth high-voltage relay (fourth relay)
16 load Rs
17 load Rf
18 load Rx
19 starter
20 engine control unit
21, 22 automatic driving control unit
30, 30A, 30B, 30C vehicle control system

The invention claimed is:

1. A vehicle control system for a hybrid vehicle having a first drive system and a second drive system, the vehicle control system comprising:
   a first battery;
   a second battery;
   an abnormality detection unit that detects an abnormality of the first battery, wherein the abnormality is a blown fuse, an overcharge abnormality, or a short circuit failure;
   a relay circuit disposed on an upstream side and a downstream side of the first battery;
   a first DC-DC converter connected to the relay circuit;
   a second DC-DC converter connected to the relay circuit and connected in parallel to the first DC-DC converter;
   a first relay control unit that controls the relay circuit;
   a second relay control unit that controls the relay circuit;
   a first drive control unit that controls the first drive system; and
   a second drive control unit that controls the second drive system,
wherein
   the first relay control unit and the first drive control unit are connected to a downstream side of the first DC-DC converter,
   the second relay control unit, the second battery, and the second drive control unit are connected to a downstream side of the second DC-DC converter,
   the first relay control unit and the second relay control unit interrupt the relay circuit on condition that the abnormality of the first battery is detected, and
   the second drive control unit controls the second drive system to use electric power of the second battery as a power source in response to the interruption of the relay circuit.

2. The vehicle control system according to claim 1, wherein
   the first drive control unit drives a motor included in the first drive system using electric power supplied from the first battery, and
   the second drive control unit drives the hybrid vehicle by an internal combustion engine included in the second drive system using electric power supplied from the second battery.

3. The vehicle control system according to claim 2, wherein the second drive control unit drives the hybrid vehicle by a starter of the internal combustion engine using the electric power supplied from the second battery.

4. The vehicle control system according to claim 1, wherein the second relay control unit connects the relay circuit on condition that a start signal to start the hybrid vehicle is received.

5. The vehicle control system according to claim 1, the abnormality detected is the blown fuse.

6. The vehicle control system according to claim 1, wherein
   the relay circuit includes a first relay and a second relay connected in parallel to each other on the upstream side of the first battery, and a third relay and a fourth relay connected to each other on the downstream side of the first battery,
   the first relay control unit controls the first relay and the third relay, and
   the second relay control unit controls the second relay and the fourth relay.

7. The vehicle control system according to claim 6, wherein the first relay control unit interrupts the second relay and the fourth relay of the relay circuit on condition that the abnormality of the first battery is detected.

8. The vehicle control system according to claim 6, wherein the second relay control unit interrupts the first relay and the third relay of the relay circuit on condition that a respective abnormality of the second battery is detected.

9. The vehicle control system according to claim 1, wherein the abnormality is the overcharge abnormality.

10. The vehicle control system according to claim 1, wherein the abnormality is the short circuit failure.

* * * * *